(12) United States Patent
Zhou et al.

(10) Patent No.: US 9,841,855 B2
(45) Date of Patent: Dec. 12, 2017

(54) SYSTEMS AND METHODS FOR CAPACITIVE TOUCH DETECTION

(71) Applicant: Marvell World Trade Ltd., St. Michael (BB)

(72) Inventors: Hao Zhou, Shanghai (CN); Dechao Meng, Shanghai (CN); Yiran Li, Shanghai (CN); Tao Shui, Cupertino, CA (US); Yonghua Song, Cupertino, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 272 days.

(21) Appl. No.: 14/695,386

(22) Filed: Apr. 24, 2015

(65) Prior Publication Data

US 2015/0309621 A1 Oct. 29, 2015

Related U.S. Application Data

(60) Provisional application No. 61/984,272, filed on Apr. 25, 2014.

(51) Int. Cl.
*G06F 3/045* (2006.01)
*G06F 3/041* (2006.01)
*G01R 27/26* (2006.01)
*G06F 3/044* (2006.01)

(52) U.S. Cl.
CPC ............ *G06F 3/044* (2013.01); *G06F 3/0416* (2013.01)

(58) Field of Classification Search
CPC .............................. G06F 3/044; G06F 3/0416
USPC .................................................. 345/173–178
See application file for complete search history.

(56) References Cited

U.S. PATENT DOCUMENTS

| 2008/0225009 | A1* | 9/2008 | Wang | G06F 3/045 345/173 |
| 2010/0188366 | A1* | 7/2010 | Liu | G06F 3/044 345/174 |
| 2011/0279131 | A1* | 11/2011 | Kim | G06F 3/044 324/679 |
| 2015/0049057 | A1* | 2/2015 | Citta | H03K 17/962 345/174 |

* cited by examiner

*Primary Examiner* — Amit Chatly

(57) ABSTRACT

System and methods are provided for touch detection. The system includes: a sensing capacitive network configured to generate a touch-sensing signal based at least in part on a touch panel capacitance; an internal capacitive network configured to generate an input signal based at least in part on a predetermined internal capacitance; a comparative network configured to compare the touch-sensing signal with a reference signal to generate a first comparison result and compare the input signal with the reference signal to generate a second comparison result; and a signal processing component configured to generate a detection result to indicate whether a touch event occurs on the touch panel based at least in part on the first comparison result and the second comparison result.

20 Claims, 5 Drawing Sheets

SYSTEMS AND METHODS FOR CAPACITIVE TOUCH DETECTION

CROSS-REFERENCE TO RELATED APPLICATIONS

This disclosure claims priority to and benefit from U.S. Provisional Patent Application No. 61/984,272, filed on Apr. 25, 2014, the entirety of which is incorporated herein by reference.

FIELD

The technology described in this patent document relates generally to electronic circuits and more particularly to touch detection circuits.

BACKGROUND

Touch screens are widely used in various applications, such as automated teller machines, mobile phones, laptops, desktops, etc. A touch screen is used for detecting different types of user inputs. Compared to external input devices e.g., a keyboard, a mouse), a touch screen is often considered as a more effective interface in terms of convenience, flexibility and cost. A touch event on a touch screen may be sensed through various methods, such as, capacitance sensing methods. For example, a user touches a point on a touch button (or a touch pad, a touch screen). The presence or movement of a user's finger in the vicinity of the touch button disturbs or changes the electric field associated with the capacitance of the touch button and thus modifies the capacitance of the touch button. Therefore, the touch event may be detected according to the capacitance change.

SUMMARY

In accordance with the teachings described herein, system and methods are provided for touch detection. The system includes: a sensing capacitive network configured to generate a touch-sensing signal based at least in part on a touch panel capacitance; an internal capacitive network configured to generate an input signal based at least in part on a predetermined internal capacitance; a comparative network configured to compare the touch-sensing signal with a reference signal to generate a first comparison result and compare the input signal with the reference signal to generate a second comparison result; and a signal processing component configured to generate a detection result to indicate whether a touch event occurs on the touch panel based at least in part on the first comparison result and the second comparison result.

In one embodiment, a method is provided for touch detection. A touch-sensing signal is generated based at least in part on a touch panel capacitance. An input signal is generated based at least in part on a predetermined internal capacitance. The touch-sensing signal is compared with a reference signal to generate a first comparison result. The input signal is compared with the reference signal to generate a second comparison result. A detection result is generated to indicate whether a touch event occurs on the touch panel based at least in part on the first comparison result and the second comparison result.

In another embodiment, a system for touch detection includes: a touch panel associated with a touch panel capacitance; an internal capacitive network configured to generate an input signal based at least in part on a predetermined internal capacitance; a comparative network configured to compare a touch-sensing signal with a reference signal to generate a first comparison result and compare the input signal with the reference signal to generate a second comparison result, the touch-sensing signal being associated with the touch panel capacitance; and a signal processing component configured to generate a detection result to indicate whether a touch event occurs on the touch panel based at least in part on the first comparison result and the second comparison result.

DETAILED DESCRIPTION

A reference voltage is often needed for capacitance measurements in some conventional capacitance sensing methods, such as capacitance-sensing successive approximation (CSA) measurements and capacitance sensing sigma delta (CSD) measurements. However, the reference voltage may be affected by noises in supply voltages, etc. The variation of the reference voltage may cause inaccurate capacitance measurements and thus inaccurate detection results. A reference generator with enhanced power supply rejection (PSR) may be employed to generate a stable reference signal under noisy supply voltages. Such an enhanced reference generator, however, usually occupies a larger chip area, which may not be desirable in some circumstances.

Figure 1:
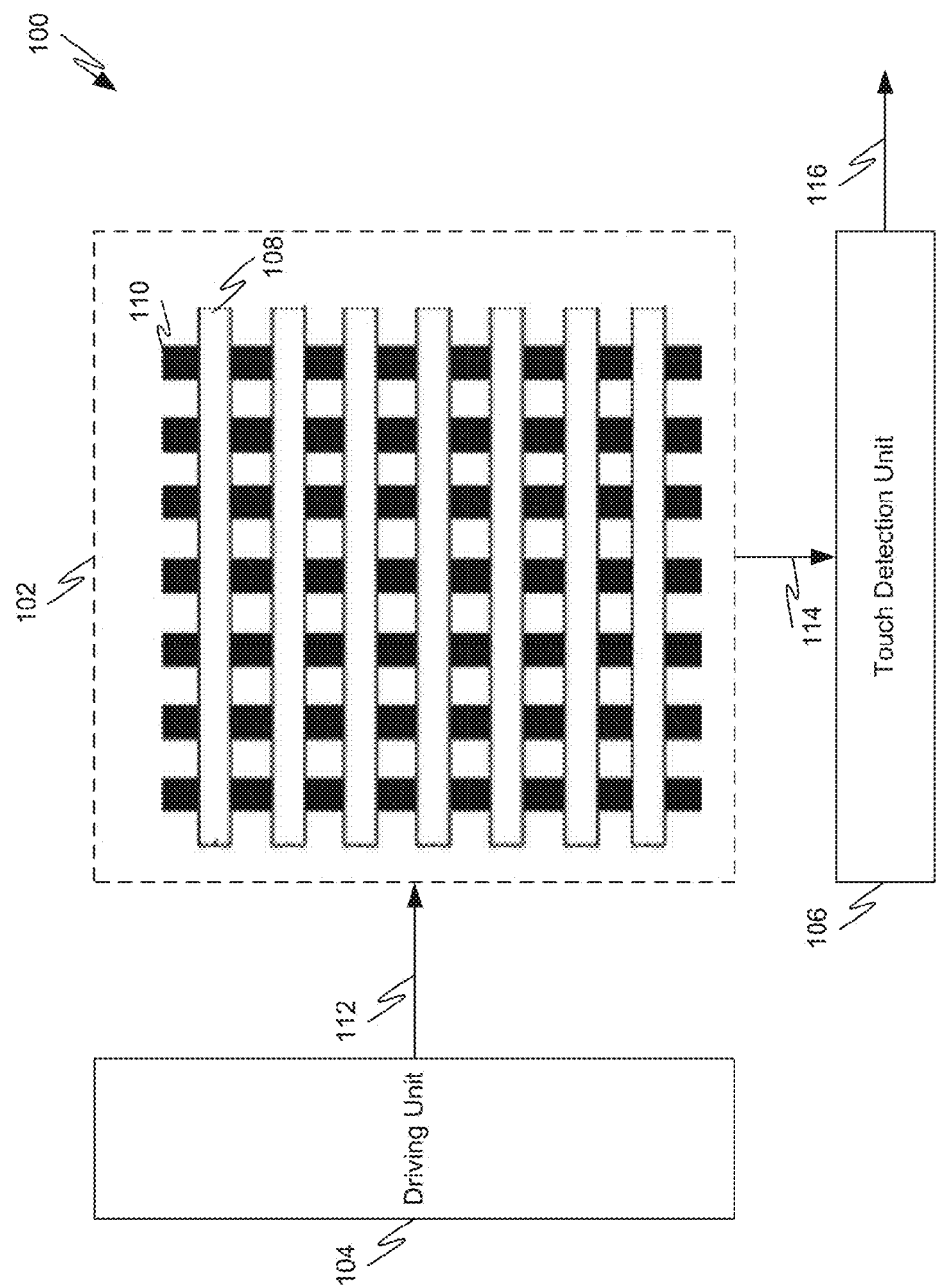
FIG. 1 depicts an example diagram showing a system for touch detection.

FIG. 1 depicts an example diagram showing a system for touch detection. As shown in FIG. 1, a driving unit 104 applies a scan signal 112 to a touch panel 102 which includes a matrix of conductive lines 108 and conductive columns 110 overlaid on the display area of the touch panel 102. Capacitance measurements are performed on the touch panel 102. A touch detection unit 106 generates a touch detection result 116 in response to an input signal 114 from the touch panel 102. The touch detection result 116 indicates whether a touch event occurs on the touch panel 102.

Specifically, the driving unit 104 applies the scan signal 112 to the conductive lines 108 and/or the conductive columns 110. If a sensing capacitance associated with a conductive line or a conductive column changes, the input signal 114 which includes raw capacitance measurement data changes correspondingly. The touch detection unit 106 determines whether a touch event occurs by comparing the input signal 114 with a baseline signal. For example, the conductive lines 108 and the conductive columns 110 may be patterned in respectively different layers and do not contact each other.

Figure 2:
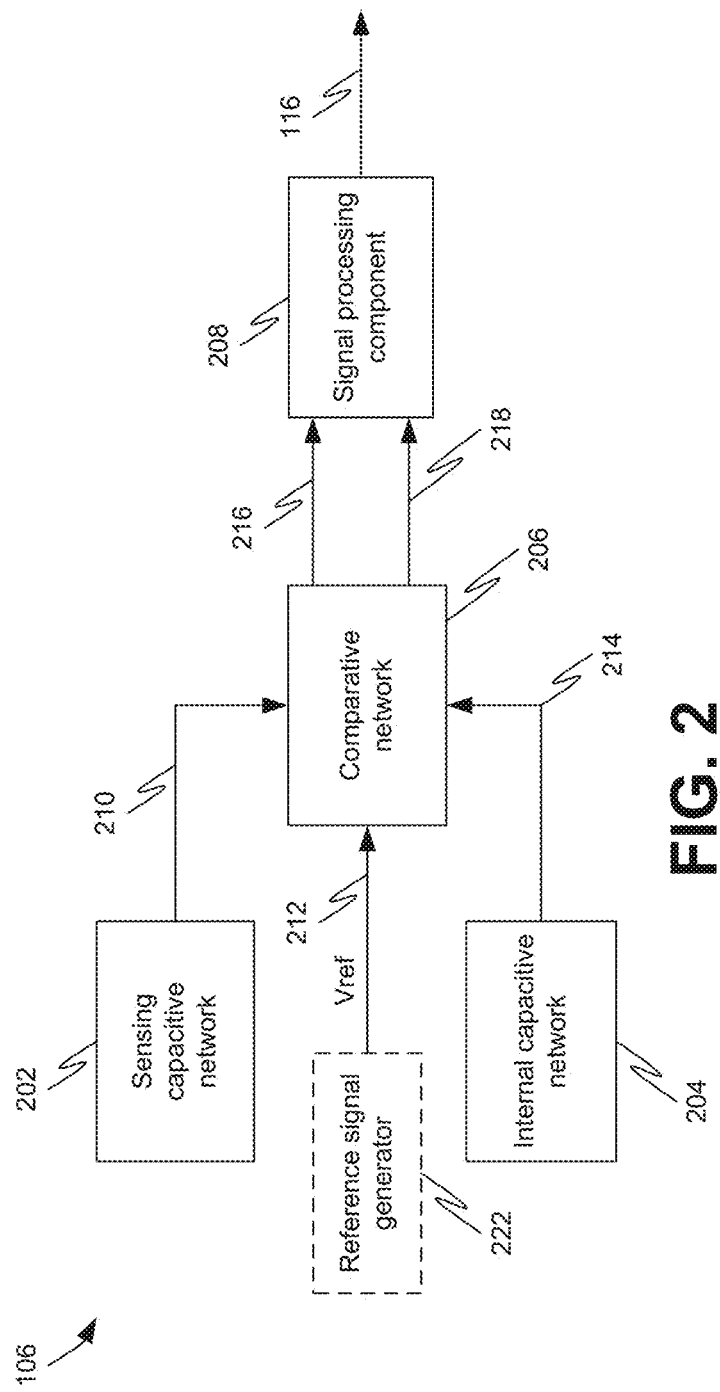
FIG. 2 depicts an example diagram of the touch detection nit as shown in FIG. 1.

FIG. 2 depicts an example diagram of the touch detection unit as shown in FIG. 1. As shown in FIG. 2, a sensing capacitive network 202 generates a touch-sensing signal 210 which indicates a capacitance of the touch panel 102. An internal capacitive network 204 generates an input signal 214 associated with a predetermined internal capacitance. A comparative network 206 compares a reference signal 212 with the touch-sensing signal 210 to generate a comparison result 216 and compares the reference signal 212 with the input signal 214 to generate another comparison result 218. The signal processing component 208 determines the detection result 116 using the comparison results 216 and 218.

Specifically, the sensing capacitive network 202 includes one or more sensing capacitors associated with the capacitance of the touch panel 102 which changes in response to a touch event (e.g., a user's finger touching on the touch panel 102). The internal capacitive network 204 includes one or more internal capacitors associated with the predetermined internal capacitance. In some embodiments, the comparative network 206 includes one or more first comparators to compare the touch-sensing signal 210 and the reference signal 212, and one or more second comparators to compare the input signal 214 and the reference signal 212. Furthermore, a reference signal generator 222 generates the reference signal 212. In certain embodiments, the reference signal generator 222 is not included in the touch detection unit 106.

Figure 3:
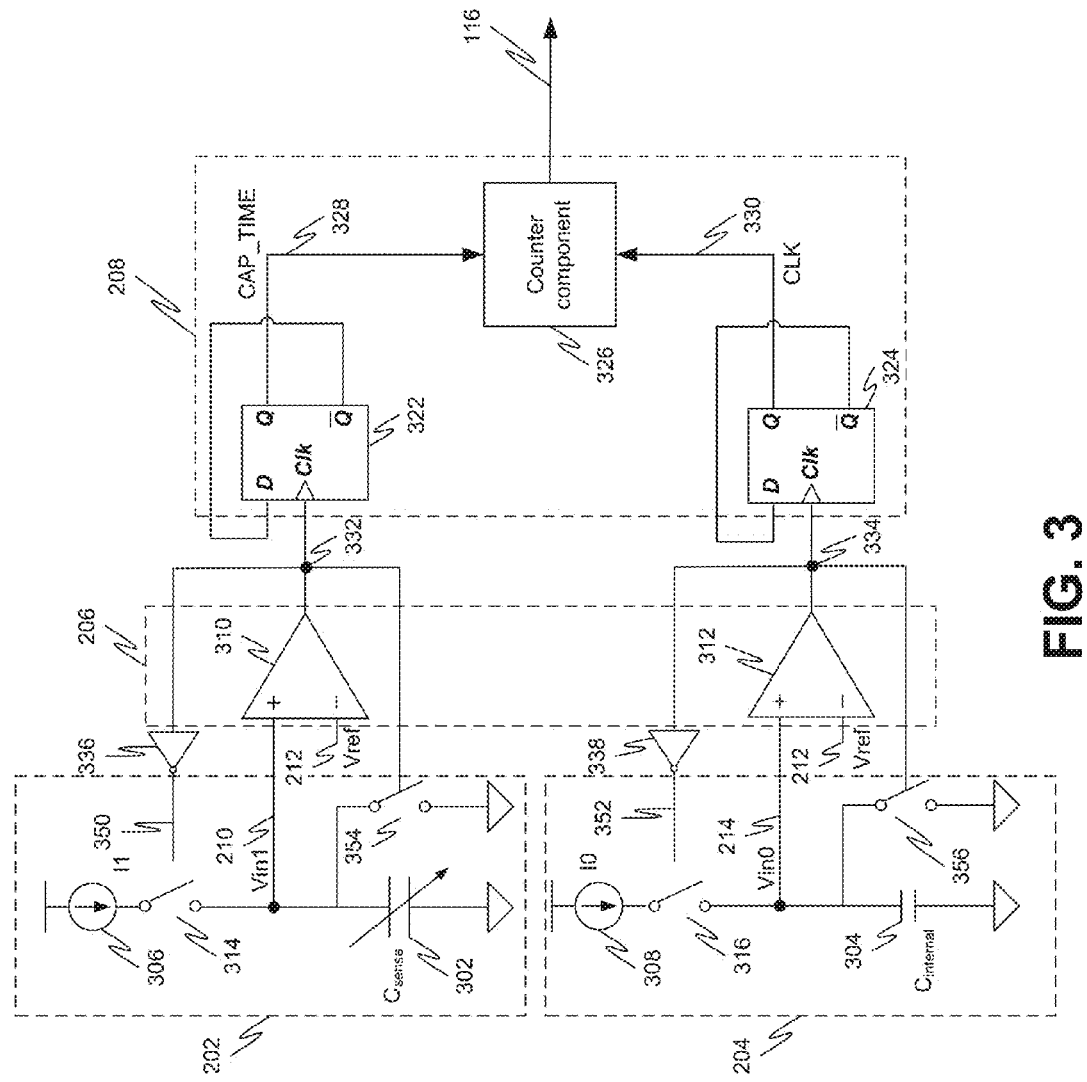
FIG. 3 depicts another example diagram of the touch detection unit as shown in FIG. 1.

FIG. 3 depicts another example diagram of the touch detection unit as shown in FIG. 1. As shown in FIG. 3, in the sensing capacitive network 202, a sensing capacitor 302 is charged by a current $I_1$ from a current source component 306 when the switch 314 is closed (e.g., being turned on). A comparator 310 within the comparative network 206 compares the touch-sensing signal 210 generated by the sensing capacitor 302 with the reference signal 212 to generate a first comparison result 332. Moreover, in the internal capacitive network 204, an internal capacitor 304 is charged by a current $I_0$ from a current source component 308 when the switch 316 is closed (e.g., being turned on). Another comparator 312 within the comparative network 206 compares the input signal 214 generated by the internal capacitor 304 with the reference signal 212 to generate a second comparison result 330. The detection result 116 is generated based on the first comparison result 332 and the second comparison result 330.

Specifically, a flip-flop 322 outputs a signal 328 (i.e., CAP_TIME) at a Clk terminal in response to the first comparison result 332. Another flip-flop 324 outputs a signal 330 (i.e., CLK) at a Clk terminal in response to the second comparison result 330. A counter component 326 determines a frequency difference between the signal 328 (i.e., CAP_TIME) and the signal 330 (i.e., CLK) and generates the detection result 116.

A NOT gate 336 generates a control signal 350 using the first comparison result 332 to close or open the switch 314. For example, when the touch-sensing signal 210 becomes larger in magnitude than the reference signal 212, the comparator 310 generates the first comparison result 332 at a logic high level. The NOT gate 336 generates the control signal 350 at a logic low level to open (e.g., to turn off) the switch 314 and the charging of the sensing capacitor 302 stops. A switch 354 is closed (e.g., being turned on) in response to the first comparison result 332 so that the sensing capacitor 302 is discharged.

Similarly, another NOT gate 338 generates a control signal 352 to close or open the switch 316. For example, when the input signal 214 becomes larger in magnitude than the reference signal 212, the comparator 312 generates the second comparison result 334 at the logic high level. The NOT gate 338 generates the control signal 352 at the logic low level to open (e.g., to turn off) the switch 316 and the charging of the internal capacitor 304 stops. A switch 356 is closed (e.g., being turned on) in response to the second comparison result 334 so that the internal capacitor 304 is discharged.

In some embodiments, the sensing capacitor 302 represents a self capacitance associated with one or more conductive lines or conductive columns of the touch panel 102. In certain embodiments, the sensing capacitor 302 represents a mutual capacitance between a conductive line and a conductive column of the touch panel 102. For example, the capacitance of the internal capacitor 304 is 2 pF, which is approximately one tenth of the capacitance of the sensing capacitor 302 when no touch event occurs. When the current $I_0$ from the current source component 308 is approximately equal in magnitude to one tenth of the current $I_1$ from the current source component 306, the frequency of the signal 328 (i.e., CAP_TIME) is approximately equal to that of the signal 330 (i.e., CLK).

When a touch event occurs (e.g., a user's finger touching the touch panel 102), the capacitance of the sensing capacitor 302 changes. The cycle time of the signal 328 (i.e., CAP_TIME) changes (e.g., linearly) with the capacitance of the sensing capacitor 302, and the cycle time of the signal 330 (i.e., CLK) remains constant. The cycle times of the signal 328 and the signal 330 are determined as follows:

$$T_{CLK} = \frac{C_{internal} \cdot V_{ref}}{I_0} \qquad (Eq.\ 1)$$

$$T_{CAP\_TIME} = \frac{C_{sense} \cdot V_{ref}}{I_1}$$

Where $C_{sense}$ represents the capacitance of the sensing capacitor 302, $C_{internal}$ represents the capacitance of the internal capacitor 304, and $V_{ref}$ represents the reference signal 212.

Figure 4:
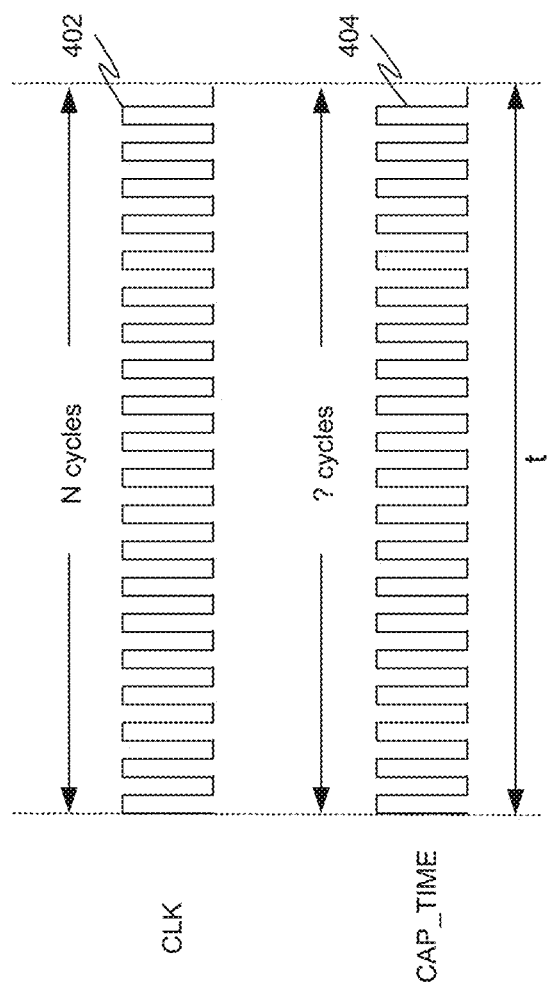
FIG. 4 depicts an example timing diagram of the touch detection unit as shown in FIG. 3.

FIG. 4 depicts an example timing diagram of the touch detection unit as shown in FIG. 3. As shown in FIG. 4, the counter component 326 determines a number of cycles of the signal 330 (e.g., as shown by a waveform 402) during a predetermined time period t. For example, the signal 330 (i.e., CLK) has N cycles in the time period t. Further, the counter component 326 determines a number of cycles of the signal 328 (e.g., as shown by a waveform 404) during the predetermined time period t. The number of cycles of the signal 328 (i.e., CAP_TIME) in the time period t is determined as follows:

$$\text{count} = \frac{N \cdot T_{CLK}}{T_{CAP\_TIME}} = N \cdot \frac{C_{internal} \cdot I_1}{C_{sense} \cdot I_0} \qquad (Eq.\ 2)$$

where N represents the number of cycles of the signal 330 in the time period t. The comparison between the number of cycles of the signal 330 and the number of cycles of the signal 328 in the time period t is carried out for determining the detection result 116.

Referring back to FIG. 2 and FIG. 3, the same reference signal 212 is used for comparison with the outputs of the sensing capacitive network 202 and the internal capacitive network 204 respectively, and thus the detection result 116 is not affected by process variants, noises in supply voltages, temperature changes, etc. For example, if the reference signal 212 varies in response to noisy supply voltages, both the signal 328 (i.e., CAP_TIME) and the signal 330 (i.e., CLK) would be affected (e.g., synchronously), and the detection result 116 may not be affected. In another example, when the temperature changes, the current $I_0$ and the current may be affected. But the current $I_0$ and the current $I_1$ are matched, and thus the current $I_0$ and the current $I_1$ change at approximately a same ratio. So the detection result 116 may not be affected by the temperature changes. In some embodiments, the reference signal generator 222 does not need to have a high PSR, and thus it may be designed properly to save chip area.

Figure 5:
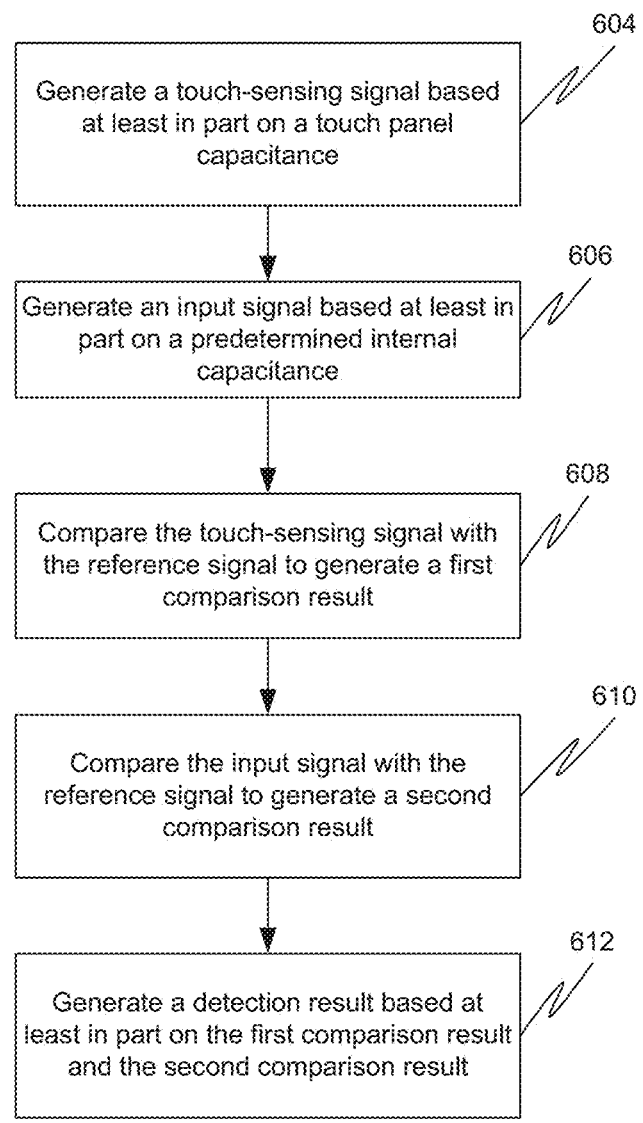
FIG. 5 depicts an example flow chart for touch detection.

FIG. 5 depicts an example flow chart for touch detection. At 604, a touch-sensing signal is generated based at least in part on a touch panel capacitance. At 606, an input signal is generated based at least in part on a predetermined internal capacitance. At 608, the touch-sensing signal is compared with a reference signal to generate a first comparison result. At 610, the input signal is compared with the reference signal to generate a second comparison result. At 612, a detection result is generated to indicate whether a touch event occurs on the touch panel based at least in part on the first comparison result and the second comparison result.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A system for touch detection of a touch panel, the system comprising:
    a sensing capacitive network configured to generate a touch-sensing signal based at least in part on a touch panel capacitance;
    an internal capacitive network configured to generate an input signal based at least in part on a predetermined internal capacitance;
    a comparative network configured to
        compare the touch-sensing signal with a reference signal to generate a first comparison result, and
        compare the input signal with the reference signal to generate a second comparison result; and
    a signal processing component configured to generate a detection result to indicate whether a touch event occurs on the touch panel based at least in part on a comparison between the first comparison result and the second comparison result, wherein the signal processing component includes:
        a first flip-flop component configured to generate a first clock signal that has a cycle time that (i) is based at least in part on the first comparison result and (ii) is a function of the touch panel capacitance; and
        a second flip-flop component configured to generate a second clock signal that has a cycle time that (i) is based at least in part on the second comparison result and (ii) is a function of the internal capacitance.

2. The system of claim 1, wherein the sensing capacitive network includes one or more sensing capacitors associated with the touch panel capacitance, the touch panel capacitance changing in response to the touch event.

3. The system of claim 2, wherein the sensing capacitive network further includes a current source component configured to generate a current to charge the one or more sensing capacitors to generate the touch-sensing signal based at least in part on the first comparison result.

4. The system of claim 2, wherein the sensing capacitive network is further configured to discharge the one or more sensing capacitors based at least in part on the first comparison result.

5. The system of claim 2, wherein the sensing capacitive network further includes:
    a first switch configured to conduct a first current to charge the one or more sensing capacitors; and
    a second switch configured to conduct a second current to discharge the one or more sensing capacitors.

6. The system of claim 1, wherein the internal capacitor device includes one or more internal capacitors.

7. The system of claim 6, wherein the internal capacitive network further includes a current source component configured to charge the one or more internal capacitors to generate the input signal based at least in part on the second comparison result.

8. The system of claim 6, wherein the internal capacitive network is further configured to discharge the one or more internal capacitors based at least in part on the second comparison result.

9. The system of claim 6, wherein the internal capacitive network further includes:
    a first switch configured to conduct a first current to charge the one or more internal capacitors; and
    a second switch configured to conduct a second current to discharge the one or more internal capacitors.

10. The system of claim 1, wherein the comparative network includes:
    a first comparator configured to compare the touch-sensing signal and the reference signal; and
    a second comparator configured to compare the input signal and the reference signal.

11. The system of claim 1, wherein the signal processing component is further configured to:
    determine a first number of cycles of the second clock signal within a predetermined time period;
    determine a second number of cycles of the first clock signal within the predetermined time period; and
    generate the detection result based at least in part on the first number of cycles and the second number of cycles.

12. A method for touch detection of a touch panel, the method comprising:
    generating a touch-sensing signal based at least in part on a touch panel capacitance;
    generating an input signal based at least in part on a predetermined internal capacitance;
    comparing the touch-sensing signal with a reference signal to generate a first comparison result;
    comparing the input signal with the reference signal to generate a second comparison result;
    generating a detection result to indicate whether a touch event occurs on the touch panel based at least in part on a comparison between the first comparison result and the second comparison result;
    generating a first clock signal that has a cycle time that (i) is based at least in part on the first comparison result and (ii) is a function of the touch panel capacitance; and
    generating a second clock signal that has a cycle time that (i) is based at least in part on the second comparison result and (ii) is a function of the internal capacitance.

13. The method of claim 12, further comprising:
generating a current to charge one or more sensing capacitors associated with the touch panel capacitance to generate the touch-sensing signal based at least in part on the first comparison result.

14. The method of claim 13, further comprising:
discharging the one or more sensing capacitors associated with the touch panel capacitance based at least in part on the first comparison result.

15. The method of claim 12, further comprising:
charging one or more internal capacitors associated with the predetermined internal capacitance to generate the input signal based at least in part on the second comparison result; and
discharging the one or more internal capacitors associated with the predetermined internal capacitance based at least in part on the second comparison result.

16. The method of claim 12, wherein generating the detection result includes:
determining a first number of cycles of the second clock signal within a predetermined time period;
determining a second number of cycles of the first clock signal within the predetermined time period; and
generating the detection result based at least in part on the first number of cycles and the second number of cycles.

17. A system for touch detection, the system comprising:
a touch panel having a touch panel capacitance;
an internal capacitive network configured to generate an input signal based at least in part on a predetermined internal capacitance;
a comparative network configured to
  compare a touch-sensing signal with a reference signal to generate a first comparison result, and
  compare the input signal with the reference signal to generate a second comparison result; and
a signal processing component configured to generate a detection result to indicate whether a touch event occurs on the touch panel based at least in part on a comparison between the first comparison result and the second comparison result, wherein the signal processing component includes:
  a first flip-flop component configured to generate a first clock signal that has a cycle time that (i) is based at least in part on the first comparison result and (ii) is a function of the touch panel capacitance; and
  a second flip-flop component configured to generate a second clock signal that has a cycle time that (i) is based at least in part on the second comparison result and (ii) is a function of the internal capacitance.

18. The system of claim 1, wherein the sensing capacitive network is configured to generate a first current to charge touch panel, and the internal capacitive network is configured to generate a second current to charge the internal capacitor device, and a ratio of the first current divided by the second current approximately equals a ratio of the touch panel capacitance divided by the internal capacitance.

19. The system of claim 1, wherein a frequency of the touch-sensing signal and a frequency of the internal signal are approximately equal.

20. The system of claim 1, wherein the touch panel capacitance is a capacitance of a touch panel and the internal capacitance is capacitance of an internal capacitor device.

* * * * *